(12) United States Patent
Gayfer et al.

(10) Patent No.: US 6,666,528 B1
(45) Date of Patent: Dec. 23, 2003

(54) EMPTY LOAD DEVICE

(75) Inventors: Robert Gayfer, Watertown, NY (US); Michael Spadaccini, Dexter, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 10/228,987

(22) Filed: Aug. 28, 2002

(51) Int. Cl.⁷ ................................................. B60T 8/18
(52) U.S. Cl. ..................................... 303/9.69; 303/22.1
(58) Field of Search ............................. 303/9.69, 22.1, 303/22.2, 22.7, 22.8

(56) References Cited

U.S. PATENT DOCUMENTS

| | | | |
|---|---|---|---|
| 3,583,772 A | * | 6/1971 | Reno .......................... 303/22.1 |
| 3,612,621 A | * | 10/1971 | Scott .......................... 303/22.1 |
| 3,639,010 A | * | 2/1972 | Mayer et al. .............. 303/22.1 |
| 3,671,086 A | | 6/1972 | Scott |
| RE28,539 E | * | 9/1975 | Scott .......................... 303/22.1 |
| 3,927,916 A | | 12/1975 | Masuda |
| 3,936,097 A | | 2/1976 | Yanagawa et al. |
| 4,045,094 A | | 8/1977 | Yanagawa et al. |
| 4,080,005 A | | 3/1978 | Engle |
| 4,417,767 A | | 11/1983 | Billeter |
| 4,844,554 A | | 7/1989 | Rojecki |
| 4,917,148 A | * | 4/1990 | Tamamori .............. 137/596.18 |
| 5,005,915 A | | 4/1991 | Hart et al. |
| 5,106,168 A | | 4/1992 | McKay |
| 5,211,450 A | | 5/1993 | Gayfer et al. |

* cited by examiner

Primary Examiner—Christopher P. Schwartz
(74) Attorney, Agent, or Firm—Barnes & Thornburg (57) ABSTRACT

An empty-load system including a first housing having brake cylinder, control valve, equalization volume reservoir and pilot ports. The first housing also has a ratio means for controlling the connection between ports and has a piston responsive to a pilot pressure to operate the ratio means. The system also includes a second housing having a brake cylinder port and a pilot port connected, respectively, to the brake cylinder port and the pilot port of the first housing. The second housing also has a sensor means, having a sensor piston, for sensing the load of a railcar and has a sensor valve for connecting the brake cylinder port to the pilot port for a first position of the sensor piston.

10 Claims, 9 Drawing Sheets

EMPTY LOAD DEVICE

BACKGROUND AND SUMMARY OF THE INVENTION

The present invention relates to empty load devices for load-sensing and proportioning of brake signals on a rail car and more specifically to an empty-load device having separate load sensing and signal proportioning valve housings.

Some examples of empty-load devices currently in use are shown in U.S. Pat. Nos. 3,671,086 (Scott), 4,417,767 (Billeter) and 5,211,450 (Gayfer).

Billeter and Scott disclose what is known as SC-1 equipment, which has two portions: a sensor portion in a separate housing and a proportioning portion in a separate housing. Load sensing is effected by displacement of the rail car springs related to the rail car's weight when empty and loaded. Generally, sensing occurs when the rail car's springs deflect nominally more than 25% of the travel between empty-car and loaded-car conditions. The sensor mounted to the rail car body detects spring displacement and operates to pilot a proportioning valve with pressure from a brake cylinder. The difficulty with this SC-1 equipment is that, at the point of changeover braking from loaded-car to empty-car brake conditions, the brake cylinder pressure is directed to a proportioning valve through a downstream equalizing volume reservoir of nominally 600 cubic inches (cu. in.). At changeover, and because the brake cylinder pressure is directed through the 600 cu. in. equalizing volume, the brake cylinder pressure may stall or decrease until the downstream volume equalizes with the brake cylinder. In the event that the required brake cylinder pressure happens to occur at the changeover point, the brake cylinder pressure will always decrease as the equalizing volume fills.

Gayfer discloses moving the equalizing volume reservoir upstream from the brake cylinder in an empty-load device in a single housing.

The present invention provides for an empty-load system including a first housing having brake cylinder, control valve, equalization volume reservoir and pilot ports. Also included is a ratio means, in the first housing, having a ratio piston and a ratio valve for controlling the connection of the control valve port to the brake cylinder port and to the equalization port. Further included is a pilot piston in the first housing being responsive to a pilot pressure at the pilot port to operate the ratio valve. The empty-load system also includes a second housing having a brake cylinder port and a pilot port connected, respectively, to the brake cylinder port and the pilot port of the first housing. The second housing also includes a sensor means having a sensor piston for sensing the load of a railroad car and further includes a sensor valve connected to the sensor piston which connects the brake cylinder port to the pilot port for a first position of the sensor piston.

Other aspects of the present invention will become apparent from the following detailed description of the invention when considered in conjunction with the accompanying drawings.

DETAILED DESCRIPTION OF THE PREFERRED EMBODIMENTS

Figure 1:
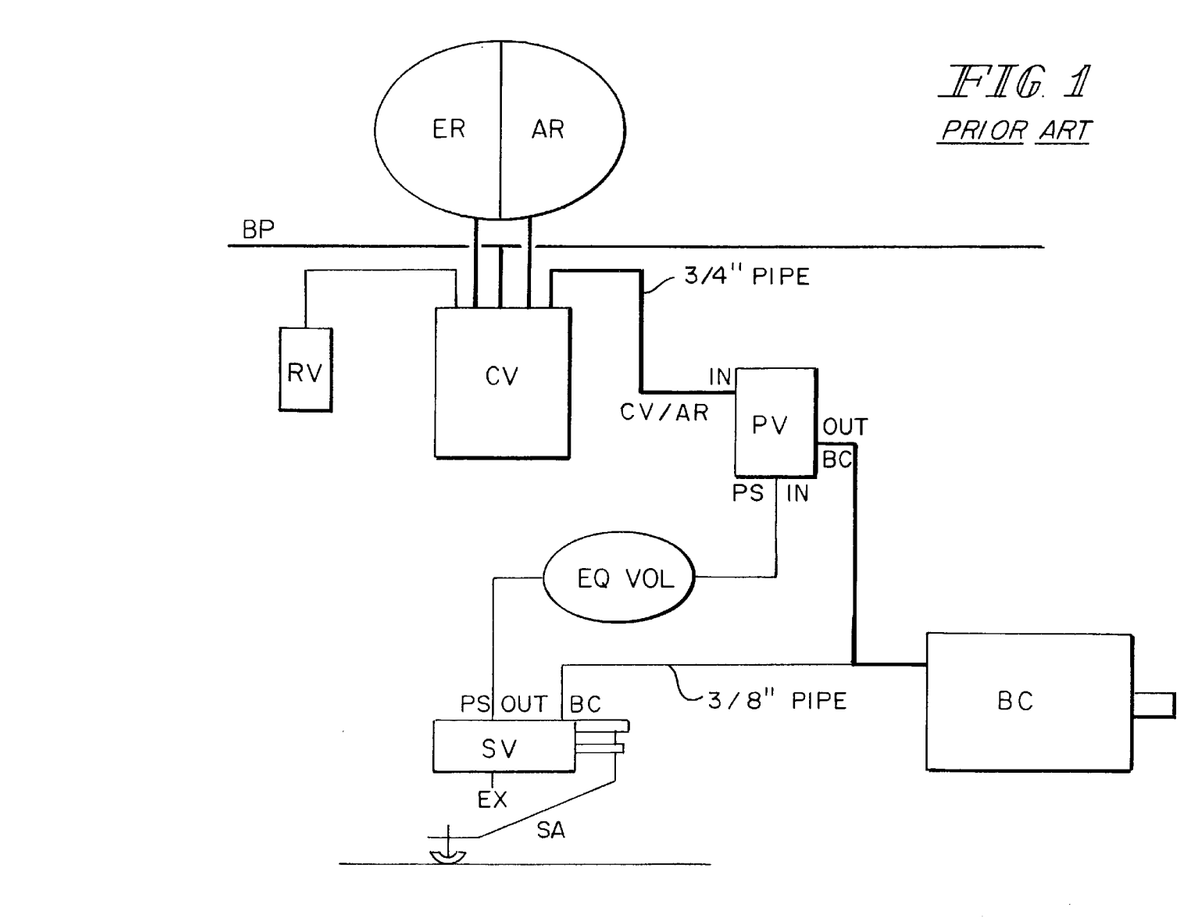
FIG. 1 is a schematic of a prior art empty-load device.

Referring to FIG. 1, in a rail brake system, emergency and auxiliary reservoirs, ER, AR respectively, are charged from a brake pipe BP through a control valve CV. In a fully charged/release position, no fluid pressure is present in a brake cylinder BC and the brake cylinder BC is connected to atmosphere through the control valve CV and retainer valve RV. The control valve CV monitors the brake pipe BP and supplies pressure from the reservoir ER/AR to, or removes pressure from, the brake cylinder BC in response to a change of pressure in the brake pipe BP. The control valve is connected to a proportioning valve PV and transfers pressure to a CV/AR IN port on the proportioning valve PV. A sensor valve SV is connected to the proportioning valve PV via ports PS OUT and PS IN. A sensor arm SA detects a rail car's loading condition, that is whether a rail car is loaded or empty. Depending upon that condition, the sensor valve SV will send an appropriate pilot signal to the proportioning valve PV. In general, under rail car braking, the pilot signal PS causes the proportioning valve PV to either proportion or pass through the AR pressure to the brake cylinder BC. The equalization volume EQ VOL is located downstream from the brake cylinder BC, that it, it is connected to the PS OUT port on the sensor valve SV and between the sensor valve SV and the proportioning valve PV. Brake pipe systems that operate like this are well known in the art and are also described in the Billeter and Scott patents referred to above.

Figure 2:
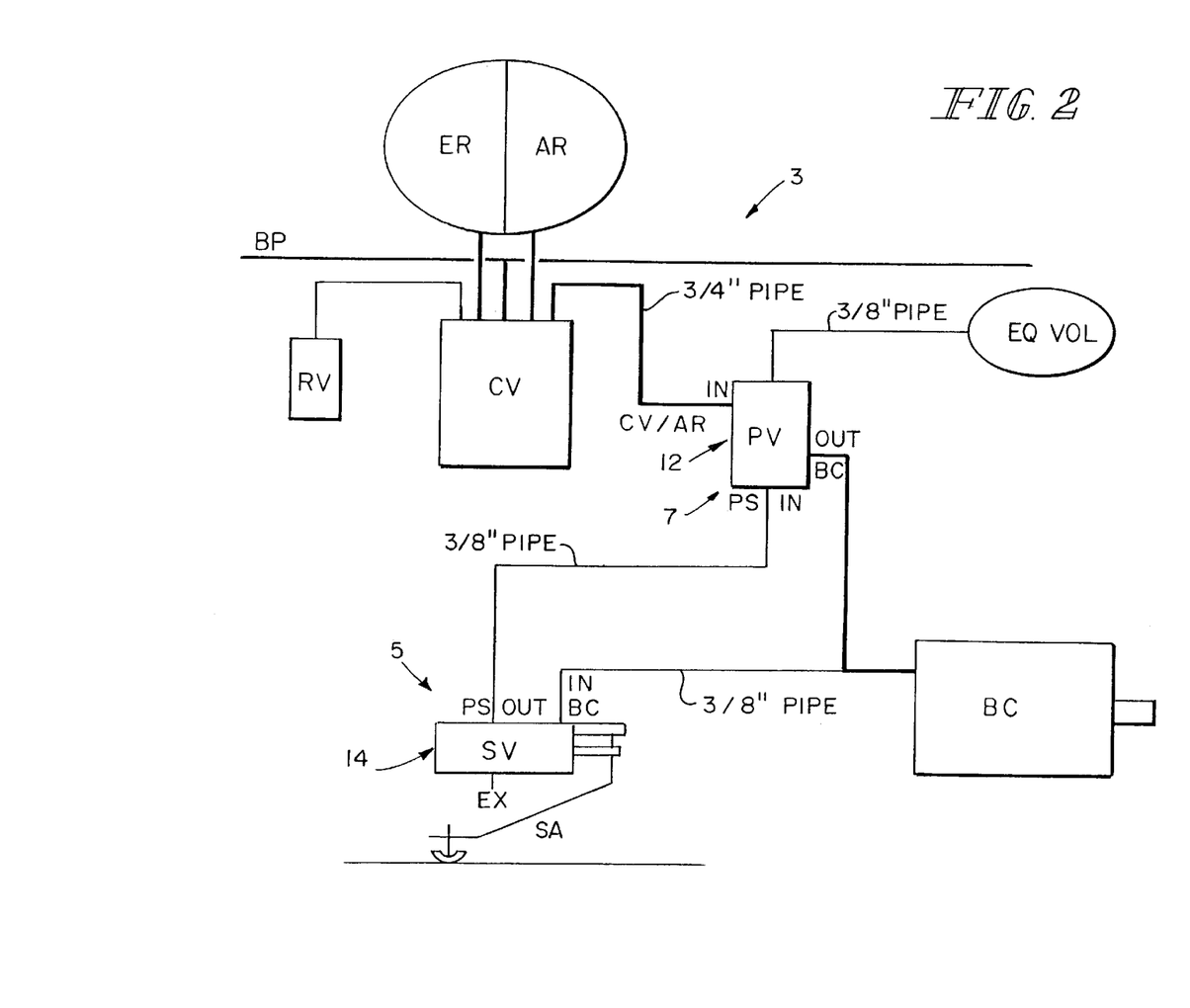
FIG. 2 is a schematic of an empty-load device, according to the present invention.

Referring to FIG. 2, generally, the inventive system works as follows. A first housing 12 includes a proportioning valve PV or 7 having a brake cylinder port BC OUT, a control valve port CV/AR IN, an equalization volume reservoir port EQ OUT and a pilot port PS IN.

As shown in FIGS. 2 and 6–9, the first housing 12 includes a ratio means 49 having a ratio piston and a ratio valve 56 for controlling the connection of the control valve port CV/AR IN or 20 to the brake cylinder port BC OUT or 22 and to the equalization port EQ OUT or 24. A pilot piston 80 in the first housing 12 is responsive to a pilot pressure signal PS at pilot port 18 to operate the ratio valve 56.

As shown in FIGS. 2 and 3–5, a second housing 14 has a brake cylinder port BC IN or 92 and a pilot port PS OUT or

88 connected, respectively, to the brake cylinder port 22 and the pilot port 18 of the first housing 12. A sensor means 45 in the second housing 14 has a sensor piston 42 for sensing the load of a railroad car (not shown). A sensor valve 90, in the second housing 14, is connected to the sensor piston 42 and connects the brake cylinder port BC OUT or 92 to the pilot port PS OUT of 88 for a first position 100 of the sensor piston 42 (See FIG. 3). A sensor arm SA or 34 is connected to the sensor valve SV or 5 and is so configured and so connected so as to sense the loading in a railroad car (not shown).

Figure 4:
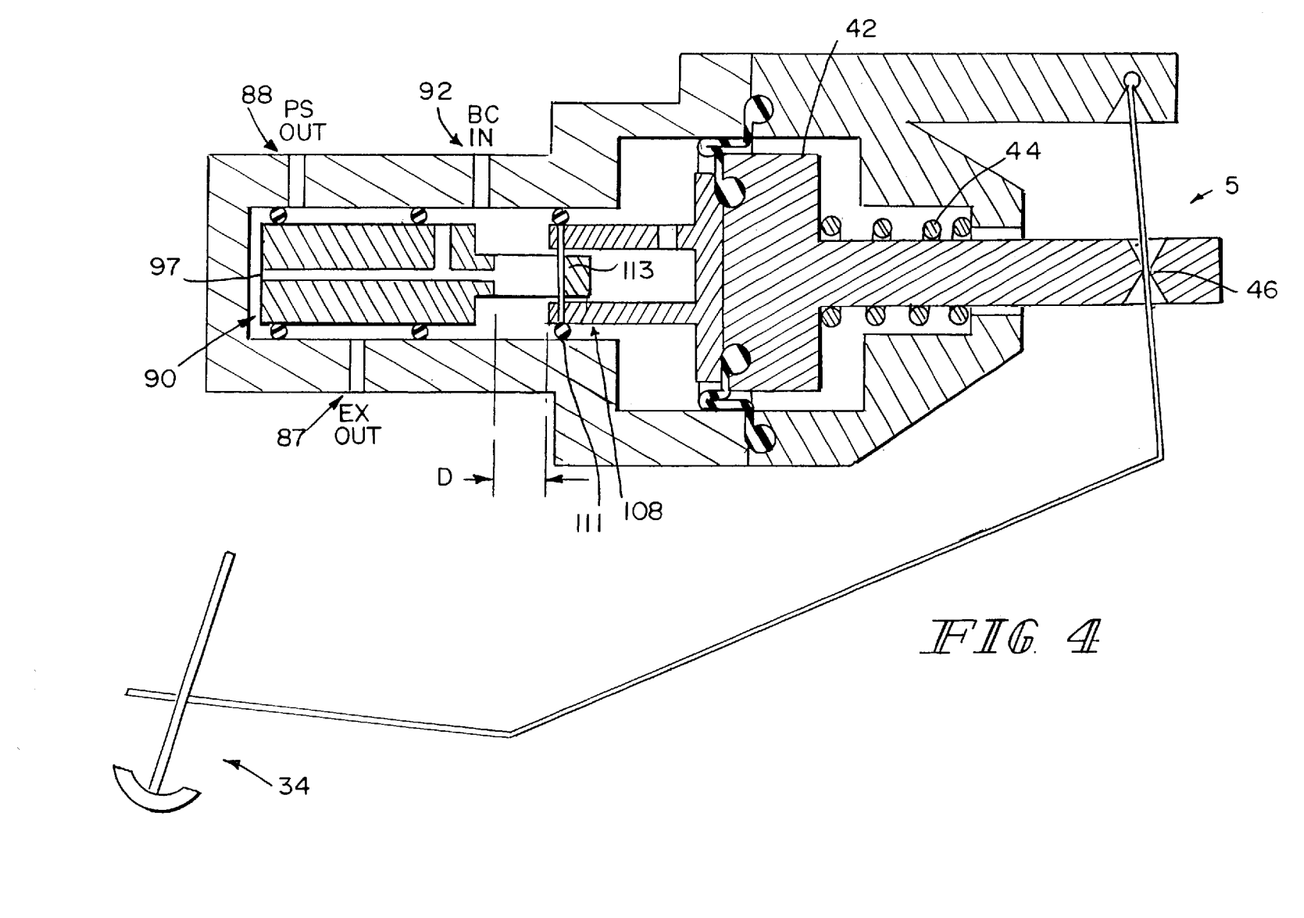
FIG. 4 is a cross-sectional view of an empty-load device sensor valve in a loaded position, according to the present invention.

As shown in FIG. 4, in a loaded rail car situation (for example, the car is more than 25% loaded), the spool valve 90 does not move from the position shown. The signal at BC IN is trapped by the spool valve 90, and the pilot signal PS at PS OUT is connected to exhaust EX OUT. In other words, the travel of the sensor arm SA is insufficient to cause the sensor valve SV to disconnect the pilot output port PS OUT from the exhaust port EX OUT and connect the brake cylinder pressure at brake cylinder port BC IN to the pilot output port PS OUT. Thus, the pilot signal PS transmitted to the proportioning valve PV is insufficient to cause the proportioning valve PV to alter or proportion the auxiliary reservoir AR IN braking signal that goes to the brake cylinder BC.

Figure 5:
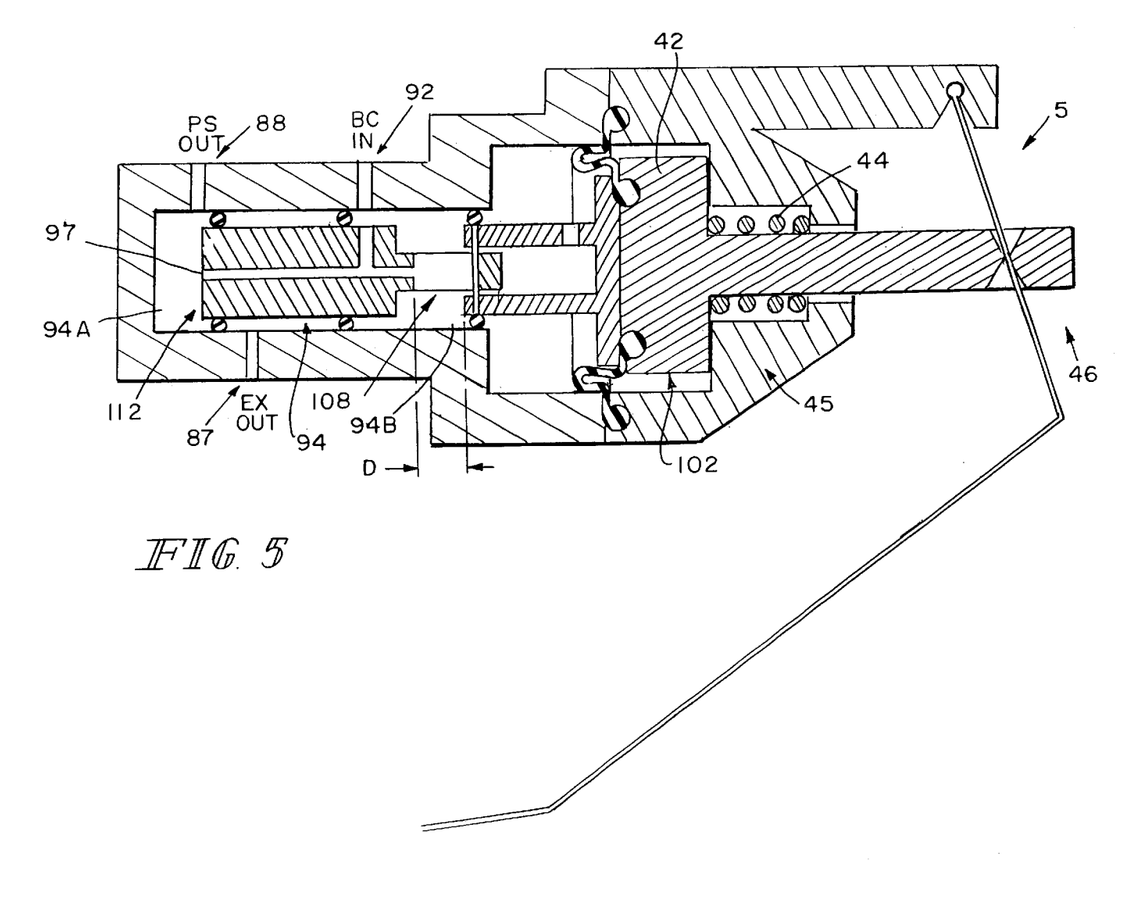
FIG. 5 is a cross-sectional view of an empty-load device sensor valve in an empty position, according to the present invention.

As shown in FIG. 5, in an empty rail car situation (for example, the car is less than 25% loaded), the sensor arm SA does travel sufficiently to cause the sensor valve SV to disconnect the pilot output port PS OUT from the exhaust port EP and to connect the brake cylinder pressure at brake cylinder port BC IN to the pilot output port PS OUT. Thus, the pilot signal PS transmitted to the proportioning valve PV is sufficient to cause the proportioning valve PV to proportion the braking signal AR IN going through the proportioning valve PV to the brake cylinder BC until the desired baking condition is achieved.

In FIG. 1, the piping from the brake cylinder BC to the sensor valve SV is nominally ⅜" as is the piping going from the sensor SV to the proportioning valve PV. However, the equalization volume reservoir EQ VOL is located downstream from the proportioning valve, that is, between the sensor valve SV and the proportioning valve PV. The reservoir EQ VOL has a volume of about 600 cubic inches (cu. in.). Downstream also means that when the equalization reservoir EQ VOL needs to be filled, for instance in a changeover from a loaded-braking condition to an empty-car braking condition, the brake cylinder BC will be called upon to supply the air pressure for charging the equalization reservoir EQ VOL and feeding the proportioning valve PV with a pilot signal PS. That usually results in a significant drop in brake cylinder BC pressure of about 8–9 psi.

In FIG. 2, the piping from the brake cylinder BC to the sensor valve SV is also nominally ⅜" as is the piping going from the sensor valve SV to the proportioning valve PV. However, here the equalization volume reservoir EQ VOL is located upstream from the proportioning valve PV and, because of that change in location, its volume has been able to be reduced to about 400 cu. in. Upstream also means that the auxiliary reservoir AR will supply the air that charges the equalization reservoir EQ VOL. The piping from the proportioning valve PV to the equalization volume EQ VOL is nominally ⅜".

As stated above, at changeover from loaded-car to empty-car braking, there is a need to provide a pressure or pilot signal PS to the proportioning valve PV. To do that, with the SC-1 equipment as shown in FIG. 1, the brake pressure signal PS coming from the brake cylinder BC must go through and fill the ⅜" piping between the brake cylinder BC and the proportioning valve PV and also fill the 600 cu. in. volume. To fill the EQ VOL, enough air must be pulled from the brake cylinder BC and that is why there is a significant decrease in brake cylinder pressure, in the range of 8–9 psi.

However, in the present invention, as shown in FIG. 2, to provide the brake pressure signal PS to the proportioning valve PV, the pressure signal PS must only go through and fill the ⅜" piping between the brake cylinder BC and the proportioning valve PV through the sensor valve SV. Thus, the loss in pressure would be in the ⅜" piping and in the range of about 1 psi. Such a loss would be substantially less than the 8–9 psi loss with the SC-1 equipment, as shown in FIG. 1.

Thus, moving the equalization volume EQ VOL upstream and also having its size decreased by approximately 200 cu. in. helps prevent the brake cylinder BC from experiencing a significant decrease in pressure during the changeover from loaded-braking to empty-car braking.

Referring again to FIG. 2, the nominal pressure that starts out in the brake pipe BP and the auxiliary reserve AR may be approximately 90 psi, for example. At empty load braking, the auxiliary reservoir AR and equalization volume EQ VOL pressure are at about 64 to 66 psi. Using, for example, a 50% ratio or proportioning valve PV, the brake cylinder BC would then be at 32 to 33 psi for an empty car braking condition. Therefore, at any pressure between 15 psi (which is the nominal brake cylinder pressure at the changeover point from loaded car to empty car braking) and full service pressure of 64 to 66 psi, the proportioning valve will supply to the brake cylinder BC nominally 50% of the auxiliary reserve AR input pressure.

An empty-load system 3 of the present invention is shown in FIGS. 2 through 9. The empty-load system includes a sensor valve, designated SV or 5 and a proportioning valve, designated PV or 7.

The empty-load system 3 also includes a first housing 12 (See FIGS. 6–9) having a brake cylinder port 22, a control valve port 20, an equalization volume port 24, a vent port 25 and a pilot port 18. Also included in the first housing 12 is a ratio means 49 having a ratio piston 48, a ratio valve 56 and ratio valve spring 58 for controlling the connection of the control valve port 20 to the brake cylinder port 22, to the equalization port 24 and to the vent port 25. A pilot piston 80 in the first housing 12 is responsive to a pilot pressure signal PS at the pilot port 18 to affect the operation of the ratio valve 56.

The first housing 12 may also include a spring 86 biasing the pilot piston 80 to open the ratio valve 56. The first pilot pressure PP-1 may have a value above which it may counteract the pressure of the spring 86 and allow closing of the ratio valve 56.

The pilot piston 80 may include an actuator rod 82 for operating the ratio valve 56. The first housing 12 may also include a guide 84 separating the pilot piston 80 from the ratio means 49 and the rod 82 may extend through the guide 84. The guide 84 pneumatically seals off the pilot signal input port 18 of the proportioning valve 7 from the brake cylinder input port 22 of the proportioning valve 7. The guide 84 may be configured to open the ratio valve 56 for a first position 104 of the ratio piston 48. The rod 82 may be retracted into the guide 84 when a first pilot pressure PP-1 is introduced at pilot port 18 (See FIGS. 7, 8).

Also included in the empty-load system 3 is a second housing 14 (See FIGS. 3–5) having a brake cylinder port 92 and pilot port 88 connected, respectively, to the brake cylinder port 22 and the pilot port 18 of the first housing 12, as shown in FIGS. 6–9. The second housing 14 also includes a sensor means or sensor arm 34 having a diaphragm sensor piston or sensor piston 42 for sensing the load of a rail car (not shown). The second housing 14 also includes a load valve 90 that is connected to the sensor piston 42 which connects the brake cylinder port 92 to the pilot port 88 for a first position 100 (See FIG. 5) of the sensor piston 42.

In the second housing 14 the sensor valve 90 may be a spool valve located in a bore 94 in the second housing 14. The second housing 14 may also include a pair of O-rings 96A, B on the spool 90 which may define a chamber 95 in the bore 94. Spool valve 90 may have a passage 97 that connects two areas 94A, B in the bore 94 on opposite ends of the chamber 95. The brake cylinder port 92, the pilot port 88 and a vent port 87 may be connected to the bore 94 such that the chamber 95 may connect the pilot port 88 and the vent port 87 for a first (brake release or loaded-car condition) position 110 of the spool valve 90 (See FIGS. 3 and 4, respectively). The passage 97 may connect the pilot port 88 and the brake cylinder port 92 for a second position 112 of the spool valve 90 (See FIG. 5). In the second housing 14, only one of the O-rings 96A will traverse one of the port connections 88 between the first position 110 and second position 112 of the spool valve 90. The spool valve 90 may be connected to a diaphragm sensor piston 42 by a lost motion connection 108. The lost motion device 108 includes a slot 109, a seal 111 and a stop or wall 113 on an extension 91 of spool valve 90, with the extension 91 located in slot 109.

The volume of the connection of the two pilot ports 18, 88 may be less than 100 cubic inches.

Figure 3:
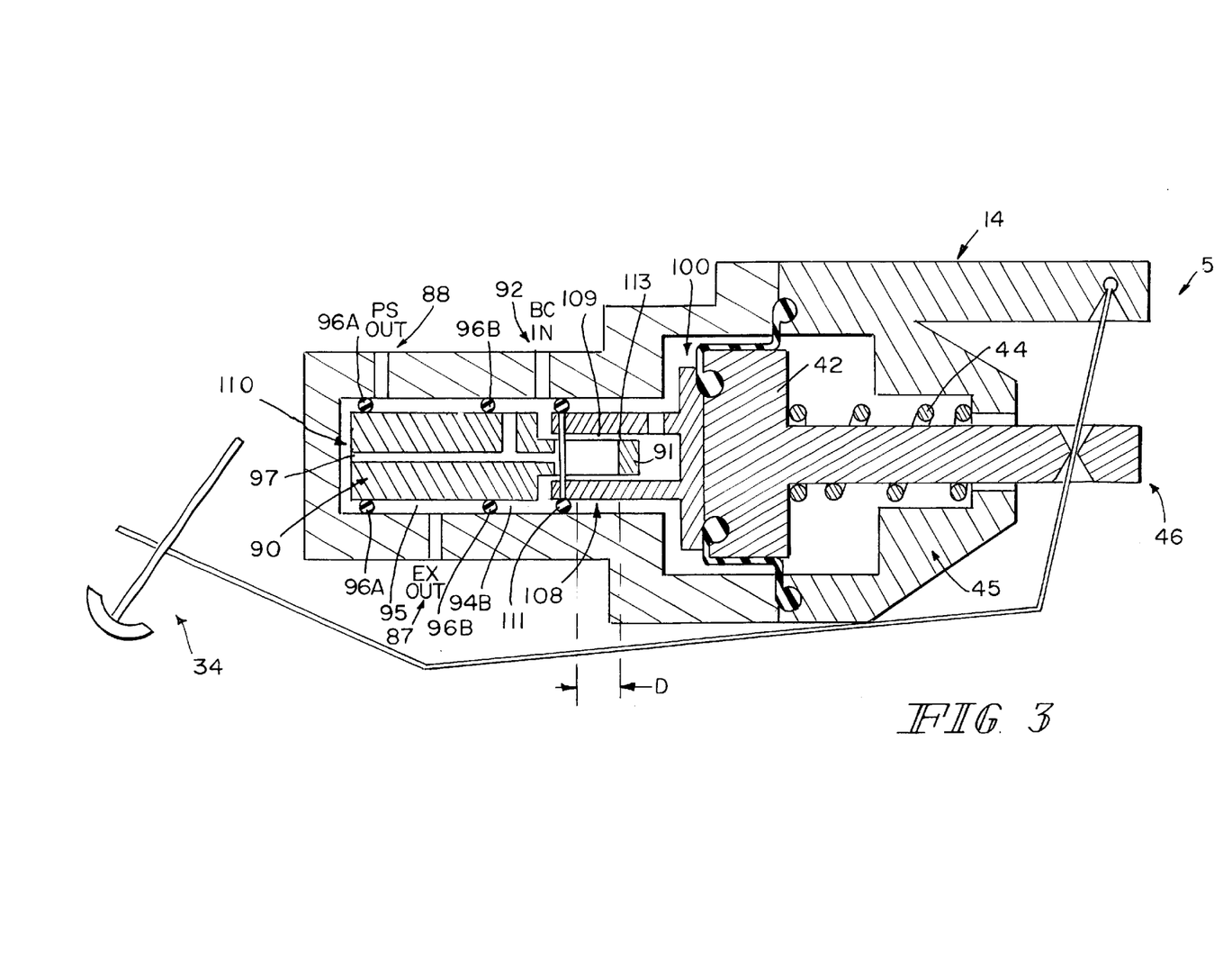
FIG. 3 is a cross-sectional view of an empty-load device sensor valve in a release position, according to the present invention.

The release position 110 of the sensor valve 42 is shown in FIG. 3. The spring 44 is biased to have the sensor lever 34 approximately against the housing 14. Spring 44 may be rated, nominally, for 15 psi. The sensor piston 42 is first in a position 100 which has the spool valve 90 in a first position 110. In this condition, the vent port 87 and the pilot signal port 88 are connected and isolated from the brake cylinder BC port. Any pilot signal PS from the sensor valve 5 to the proportional valve 7 would, in this condition, provide exhaust pressure to the pilot port 18 (See FIG. 6).

FIG. 4 shows the sensor valve 42 in a loaded-car position. In this position, the sensor arm 34 has moved causing the sensor piston 42 to move to the right (in FIG. 4) by pressure from the proportioning valve PV to the brake cylinder BC. However, the distance that sensor piston 42 moves is only a distance D sufficient to take up slack in a lost motion device 108. That is, pin 111 moves distance D until it engages or makes contact with wall or stop 113. Consequently, the movement of sensor piston 42 over distance D does not cause spool valve 90 to move and thus does not enable the brake cylinder port 92 to be connected to the pilot signal output port 88 via passage 97. Thus, the pilot signal PS from the sensor valve 5 is again governed by the connection between the vent port 87 and the pilot port 88 and the brake cylinder port 92 is isolated. The loaded-car condition in FIG. 4 and the release position described above and shown in FIG. 3, provide the same exhaust pilot signal (PS) to proportioning valve 7.

FIG. 5 shows the sensor valve 42 position for an empty-car condition. In this position, the sensor arm 34 has moved a sufficient distance through the loaded-car condition of FIG. 4 to put the sensor piston 42 in a second position 102. Thus, the spool valve 90 has moved far enough to the right (in FIG. 5) to connect brake cylinder input port 92 with pilot signal output port 88 via passage 97. Thus, the pressure coming in through brake cylinder port 92 is passed through to pilot port 88 and is transmitted as a pilot signal to pilot port 18 of the proportioning valve 7.

Figure 6:
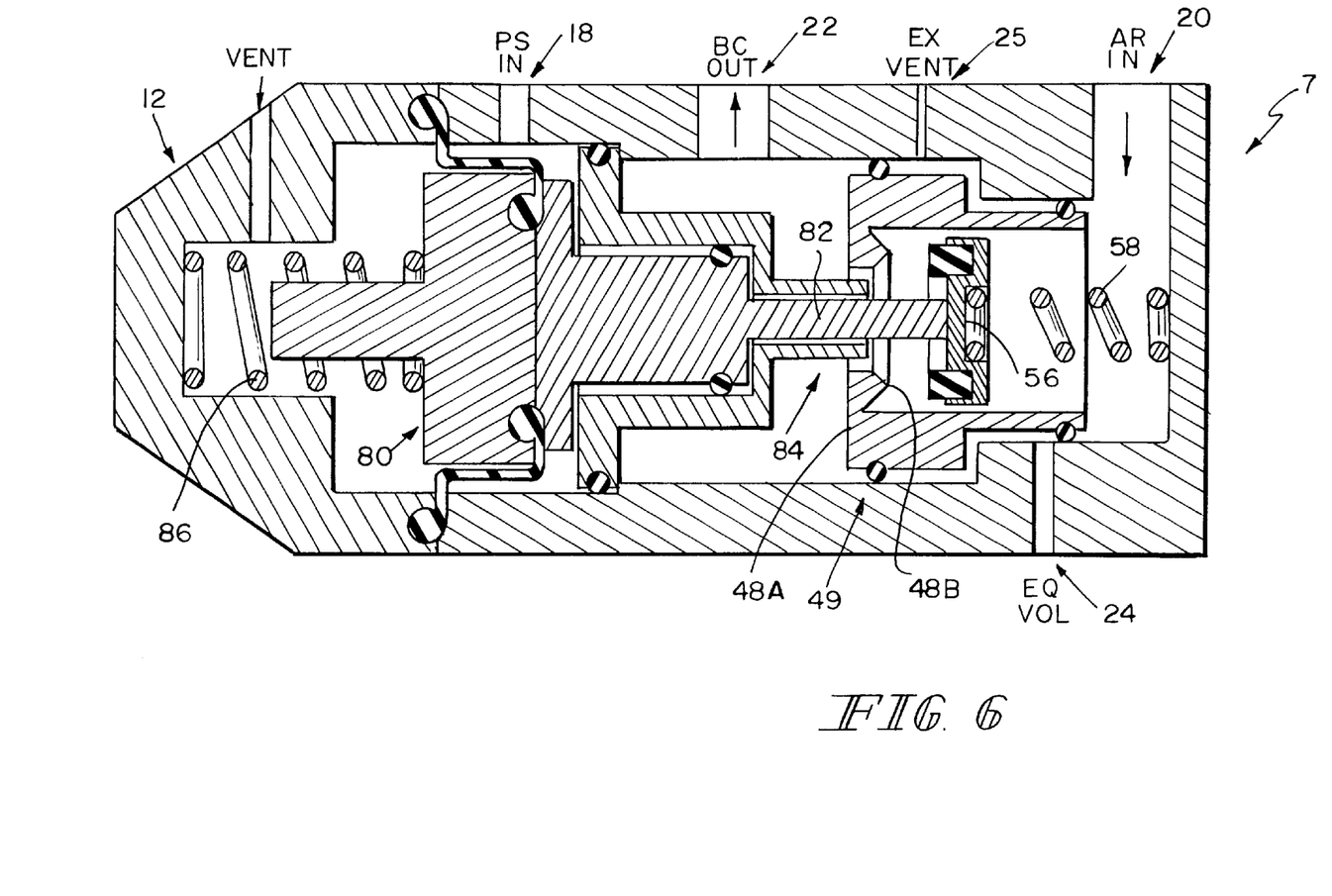
FIG. 6 is a cross-sectional view of an empty-load device proportional valve in a release and loaded position, according to the present invention.

FIG. 6 shows the position of the proportioning valve 7 under a release condition of the brakes or under a loaded-car condition. With no pressure at the pilot signal input port 18, spring 86 maintains the pilot piston to the right (in FIG. 6) causing actuator rod 82 to open ratio valve 56 against the tension of spring 58. The ratio valve 56 may be a check valve. The end of the actuator rod 82 holds the ratio valve 56 open during a release or loaded brake condition. Guide 84 pneumatically isolates brake cylinder port 22 from pilot input 18. The brake cylinder port 22 is connected with control valve port 20 through open ratio valve 56 and ratio piston 48. Thus, auxiliary reservoir AR pressure entering through control valve port 20 passes through to the brake cylinder (BC) (See FIG. 2) via brake cylinder port 22. The equalization reservoir EQ VOL at equalization volume port 24 is at exhaust pressure by its connection to vent port 25.

Figure 7:
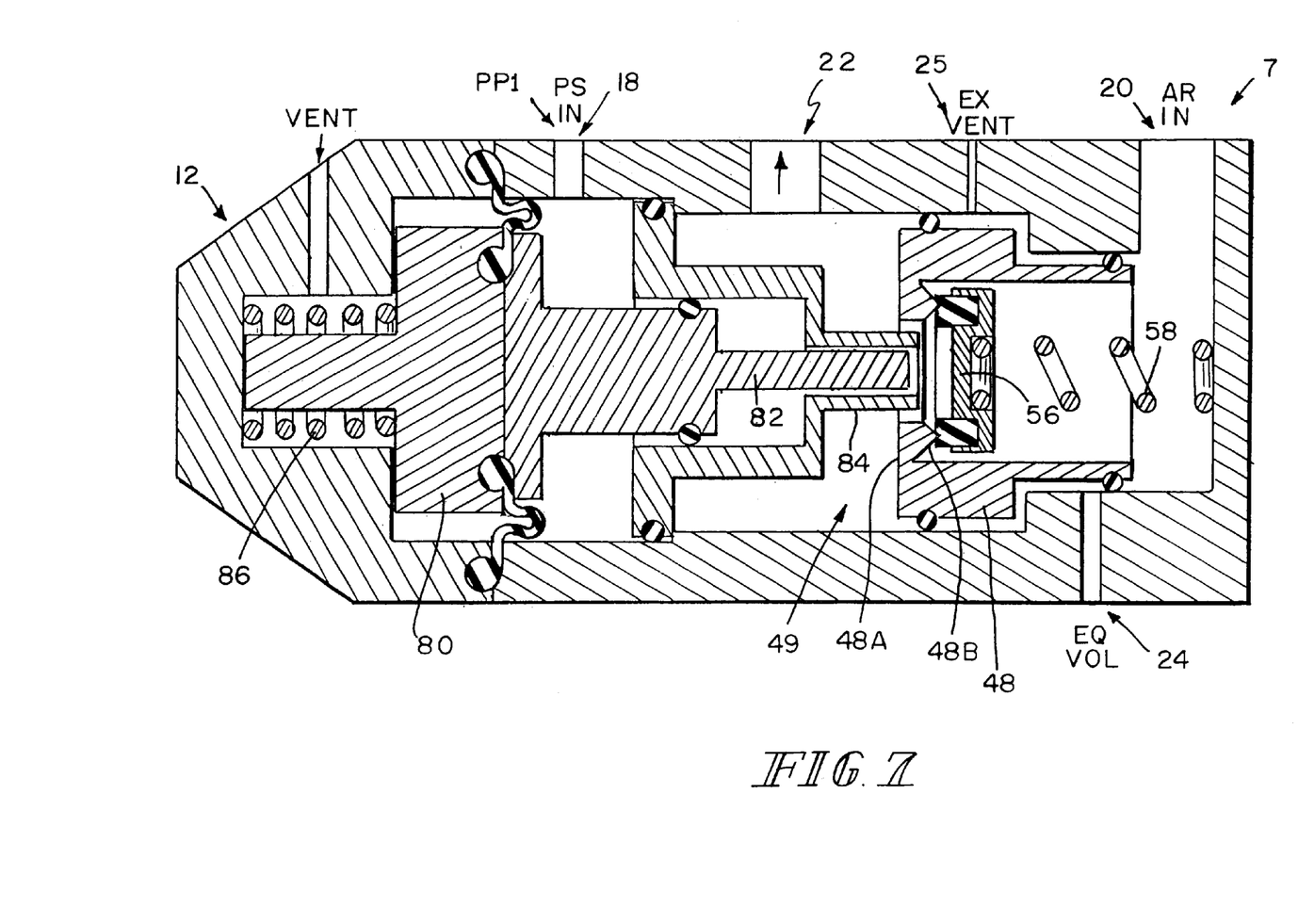
FIG. 7 is a cross-sectional view of an empty-load device proportional valve in a changeover or transitioning position for a sensed empty-car condition, according to the present invention.

FIG. 7 shows a changeover or transitioning position for the proportioning valve 7. When the fluid pressure at pilot input port 18, coming from the pilot output 88 of sensor valve 5, builds sufficiently and exceeds the equivalent pressure applied by the spring 86, pilot piston 80 will move to the left (as seen in FIG. 7). This condition represents the beginning of a changeover from a loaded-car braking condition, where auxiliary reservoir pressure AR is being fed to the brake cylinder BC (as shown in FIG. 6), towards an empty-car braking condition, where ratio piston 48 is proportioning the AR signal going to BC. In this condition, a first pilot pressure PP1, (from sensor valve 7) is applied through pilot signal input port 18 causing the pilot piston 80 to move to the left (in FIG. 7). That pressure PP1 must be sufficient to overcome the bias of spring 86, which may be rated between 2–10 psi. The pressure PP1 will not likely be a value less than the bias rating of spring 44 in sensor valve 5. The pressure PP1 causes the actuator rod 82 to be displaced or retracted into the guide 84 and the ratio valve 56 seats or closes. The equalization reservoir EQ VOL at equalization volume port 24 is still at exhaust pressure by its connection to vent port 25. Control valve port 20 is no longer connected to brake cylinder port 22, thereby terminating supply of auxiliary reservoir pressure AR to brake cylinder BC. If auxiliary reservoir pressure AR from the control valve input port 22 continues to increase, then the ratio piston will move to the condition or position shown in FIG. 8.

Figure 8:
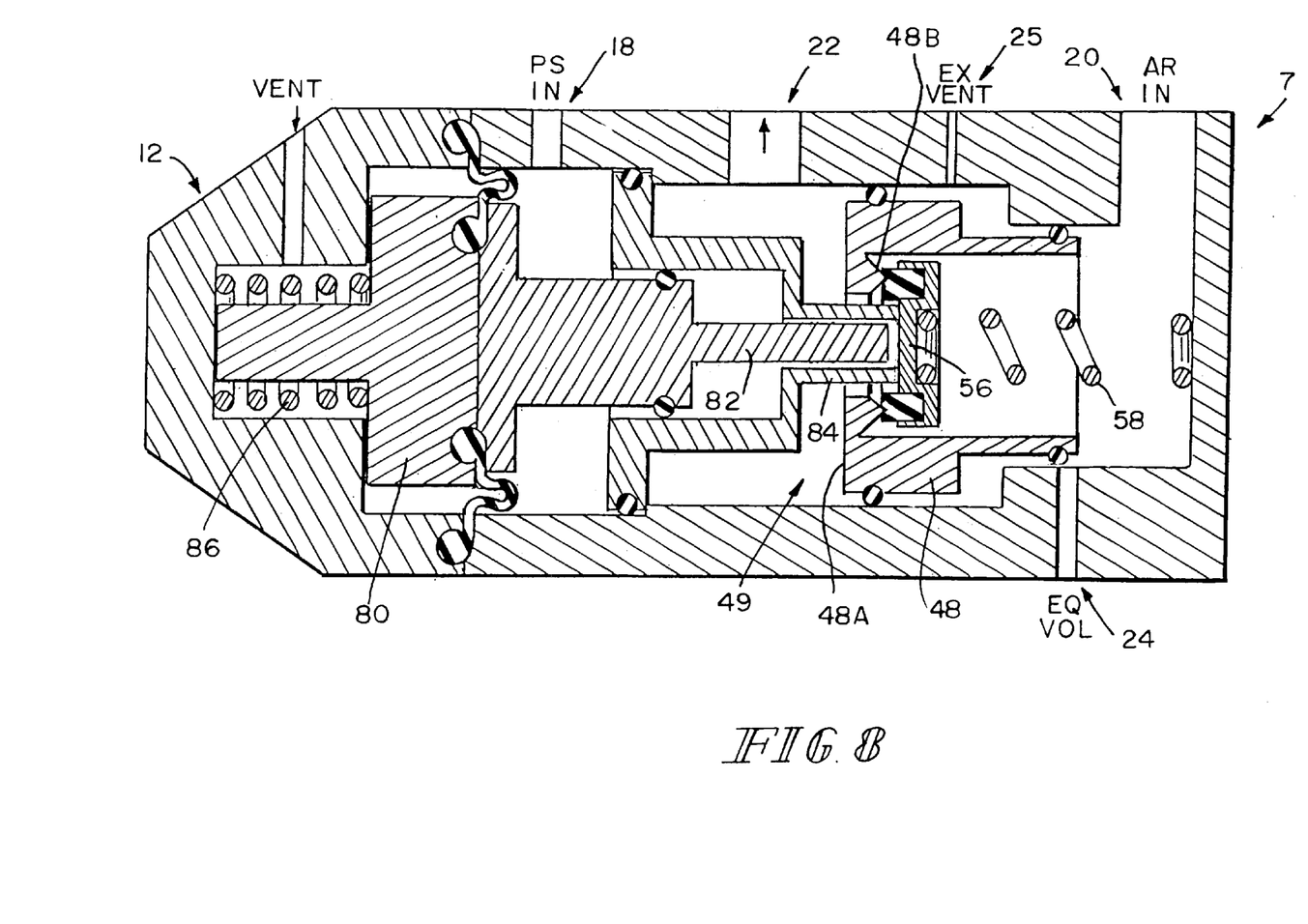
FIG. 8 is a cross-sectional view of an empty-load device proportional valve in an equalization stabilization position for a sensed empty-car condition, according to the present invention.

FIG. 8 shows an equalization volume EQ VOL connected to the AR IN or control valve port 20 and in empty lap or stabilization condition. The auxiliary reservoir AR pressure coming in through control valve port 20 has increased sufficiently to drive the ratio piston 48 to the left (in FIG. 8) which opens the connection between control valve port 20 and equalization volume port 24 and simultaneously disconnects the equalization volume port 24 from vent port 25. If the pressure requirement at the brake cylinder BC has been met, some of the AR input can bleed off through to the equalization volume (EQ VOL) via equalization port 24. If the braking requirement has not been met, then the ratio piston 48 will continue moving to the left (in FIG. 8) and eventually reach the condition as shown in FIG. 9.

The position of ratio piston 48 and ratio valve 56 in FIG. 8 represents a stable condition of the empty-load system under empty-car braking.

The equalization volume EQ VOL, as shown in FIG. 2, was located in the upstream position from, and connected to, the proportioning valve PV to prevent a significant drop in brake cylinder BC pressure during the changeover from loaded-car to empty-car braking.

Figure 9:
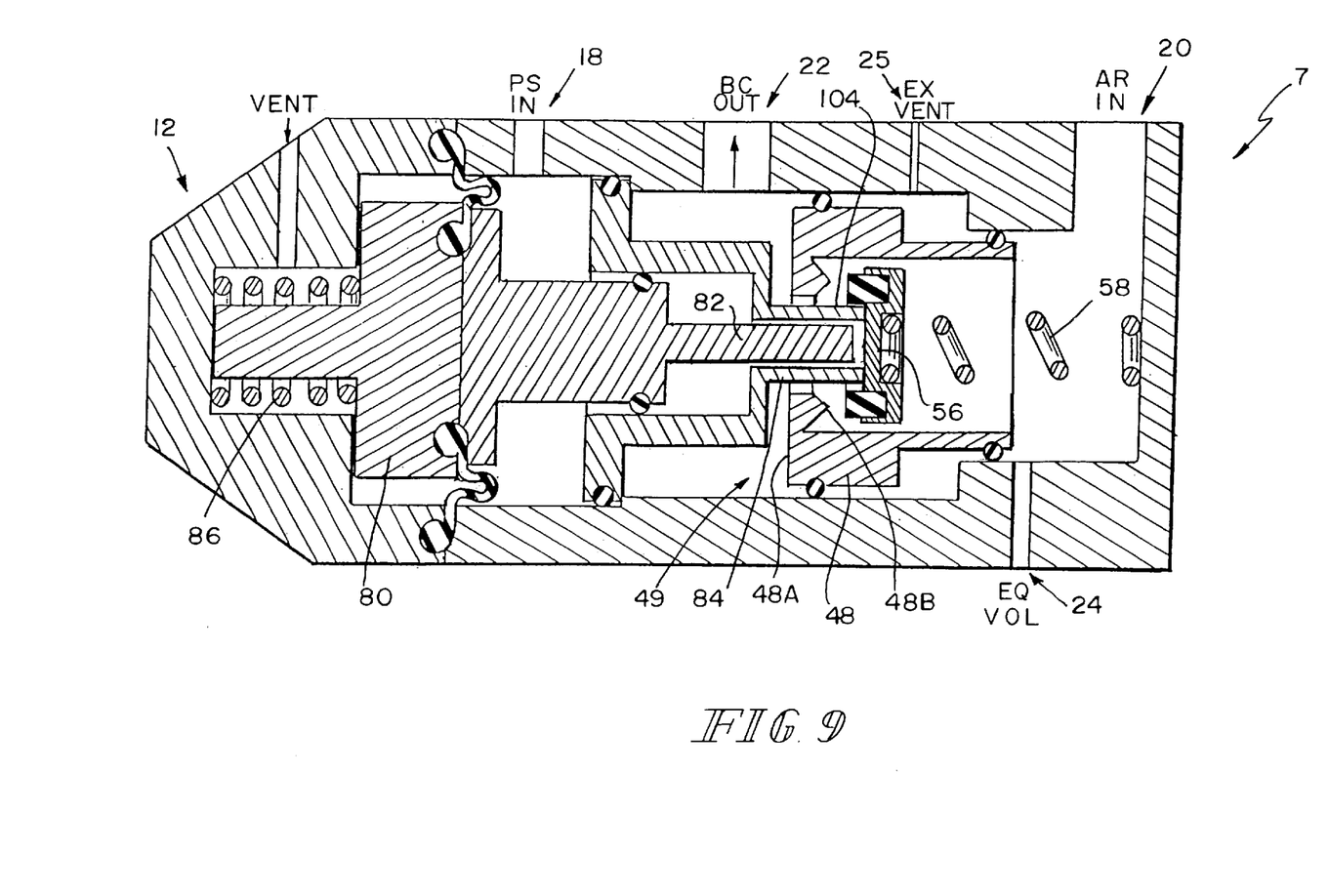
FIG. 9 is a cross-sectional view of an empty-load device proportional valve in a brake cylinder supply position for a sensed empty-car condition, according to the present invention.

FIG. 9 shows a brake cylinder supply condition for an empty car condition. Here the auxiliary reservoir AR input at control valve port 20 can flow both to the brake cylinder BC (See FIG. 2) through brake cylinder output port 22 to supply the needed pressure and can flow to the equalization volume EQ VOL through equalization port 24. Once the pressure in the brake cylinder BC has satisfied a desired ratio of auxiliary reservoir AR pressure to brake cylinder BC pressure, the ratio piston 48 will move back to the condition shown in FIG. 8. Until the desired ratio has been satisfied, guide 84 keeps ratio valve 56 open.

Referring to the stabilization condition as shown in FIG. 8 and also viewing FIG. 2, when the rail car brakes are released, air pressure will be exhausted from auxiliary reservoir AR to a retainer valve RV via the control valve CV. As the ratio piston 48 becomes unbalanced for an empty car with the change in pressure, it will move to the right (see FIG. 7) connecting the equalization port 24 to the exhaust vent 25 which allows the EQ VOL to blow down. The pressure imbalance occurs because the combined upstream piping volume and the volume of the equalizing volume EQ VOL is much smaller than the downstream volume within the brake cylinder port 22 and the brake cylinder BC. As the pressure in the auxiliary reservoir AR approximates the pressure in the brake cylinder BC, minus the bias value of spring 58, the ratio or check valve 56 will unseat and allow the brake cylinder BC pressure to flow through the proportioning valve PV to and through the control valve CV to the retainer valve RV. Finally, as the pressure in the brake cylinder BC drops below a certain level, for example approximately 15 psi, the sensor valve 5 (see FIG. 3) will exhaust the pilot output signal PS through pilot output port 88 to the pilot input port 18 of the proportioning valve 7, which will cause the proportioning valve 7 to return to its release position, as shown in FIG. 6. This keeps ratio valve 56 in an open position.

Under braking of a loaded car (see FIG. 4), pressure from the brake cylinder BC line enters through the brake cylinder input port 92. When the pressure is sufficient to match and then exceed the bias applied by spring 44, sensing piston 42 will move to the right (as seen in FIG. 4) against the resistance of spring 44, and sensing arm 34 will be lowered to the position shown in FIG. 4.

During the operation of the train in a loaded-car braking situation, the sensing lever 34 may move above or below the nominal loaded-car position due to the rock and roll of the railcar. If the rocking and rolling produces a raising of the sensing lever 34 (as seen in FIG. 4), the piston rod assembly 46 will move to the left pushing pin 111 to the left as well. Spool valve 90 will not be affected. Pilot signal output port 88 will still be connected to exhaust port 87 and thus the pilot signal PS is at atmosphere or exhaust pressure and the signal going to the proportioning valve 7 remains the same as in the loaded-car condition.

If the rock and roll causes the sensing lever 34 to lengthen or extend down (as seen in FIG. 4), this will move the push rod assembly rod 46 to the right pulling sensor piston 42 and spool valve 90 to the right as well. While this action may move the spool valve 90 far enough to permit a connection between the brake cylinder port 92 and the pilot signal output port 88 and therefore transmit a brake cylinder BC signal to the proportioning valve 7 (see FIGS. 6–9), that will have no effect on the connection between the control valve port 20 and the brake cylinder port 22 unless the ratio valve 56 closes or seats. The ratio valve 56 will seat if the PS signal at pilot signal input port 18 is sufficient to overcome spring 86 (nominally 15 psi). Nothing additional will happen, such as movement of the ratio piston 48 (in FIG. 7) to the left, unless the fluid pressure at the control port 20 exceeds the pressure at the brake cylinder port 22 by the reciprocal of the ratio piston ratio. Using an example of a 60% proportioning or ratio between the brake cylinder side 48A of the ratio piston 48 and the control valve side 48B of the ratio piston 48, and a 15 psi pressure at brake cylinder port 22, the pressure on face 48B would have to exceed 25 psi before the ratio piston 48 would move from the position shown in FIG. 7. That recognizes that rock and roll motions are usually equal and opposite and occur in alternating sequence, and the erroneous lengthening of the sensor arm 34 must occur for sufficient time to allow the brake pressure at control port 20 to rise to over 25 psi before it occupies its opposite rock or roll position. Thus, the erroneous signal must be maintained, for example, for at least one to three seconds. This is highly unlikely in the real world. The control valve CV signal at AR IN 20 would not likely exceed 25 psi because the likelihood is that the erroneous BC signal from the sensor valve 5 will be reversed back to an exhaust or atmosphere pressure, and the proportioning valve 7 will return to its position in FIG. 6.

In an empty-car situation, if an erroneous or false indication in car weight due to rock and roll is caused by the sensing arm 34 having a lengthened travel or extending further down (as seen in FIG. 5), the piston rod assembly 46 will attempt to move further to the right but that will not be possible because sensor piston 42 will have hit a limit in position 102. Thus, this attempted movement will have no effect on the output signal at output port 88 and, therefore, will have no effect on the position of the proportioning valve 7.

If an erroneous or false indication in the car weight due to rock and roll caused by the sensing arm 34 moving up from its nominal position (as seen in FIG. 5) occurs, the piston rod assembly will move to the left and may move sufficiently to cut off the brake cylinder BC signal at brake cylinder port 92 from reaching pilot signal output port 88. At this point, it may be possible that an exhaust signal will be transmitted from the sensor valve 5 to the proportioning valve 7 through pilot signal input port 18 causing pilot piston 80 (see FIGS. 6–9) to start a movement to the right to attempt to open the ratio valve 56. However, not only will ratio valve spring 58 apply its force to keep the valve 56 from opening, but the AR signal entering at control valve port 20 will also help to keep the ratio valve 56 closed or to close it quickly if it does open. Since the ratio valve 56 is closed quickly, the pressure at brake cylinder port 22 will not substantially change and therefore the braking will not be affected.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed is:
1. An empty-load system comprising:
   a first housing having brake cylinder, control valve, equalization volume reservoir and pilot ports;
   ratio means, in the first housing and having a ratio piston and a ratio valve, for controlling the connection of the control valve port to the brake cylinder port and to the equalization port;

a pilot piston in the first housing being responsive to a pilot pressure at the pilot port to operate the ratio valve;

a second housing having a brake cylinder port and a pilot port connected respectively to the brake cylinder port and the pilot port of the first housing;

a sensor means, in the second housing and having a sensor piston, for sensing a load of a railroad car; and a sensor valve, in the second housing and connected to the sensor piston, connects the brake cylinder port to the pilot port for a first position of the sensor piston.

2. The system of claim 1, wherein the pilot piston includes a rod for operating the ratio valve; and including a guide in the first housing separating the pilot piston from the ratio mean, and the rod extends through the guide.

3. The system of claim 2, wherein the guide is configured to open the ratio valve for a first position of the ratio piston.

4. The system of claim 3, wherein for a first pilot pressure, the rod is retracted into the guide.

5. The system of claim 2, wherein for a first pilot pressure, the rod is retracted into the guide.

6. The system of claim 1, including a spring in the first housing biasing the pilot piston to open the ratio valve; and a first pilot pressure, above a value which will counteract the pressure of the spring, allows closing of the ratio valve.

7. The system of claim 1, wherein the sensor valve is a spool valve in a bore in the second housing; a pair of o-rings on the spool define a chamber in the bore; a passage in the spool valve connects two areas in the bore on opposite ends of the chamber; the brake cylinder port, the pilot port and a vent port are connected to the bore such that the chamber connects the pilot port and the vent port for a first position of the spool valve; and the passage connects the pilot port and the brake cylinder port for a second position of the spool valve.

8. The system of claim 7, wherein only one of the o-rings traverses one of the port connections between the first and second positions.

9. The system of claim 1, wherein the sensor valve is a spool valve connected to a diaphragm sensor piston by a lost motion connection.

10. The system of claim 1, wherein the volume of the connection of the two pilot ports is less than 100 cubic inches.

* * * * *